United States Patent
Lu et al.

(10) Patent No.: US 12,351,696 B2
(45) Date of Patent: Jul. 8, 2025

(54) COPOLYMER-SILICA HYBRID AEROGELS AND METHODS FOR THE PREPARATION THEREOF

(71) Applicant: National Research Council of Canada, Ottawa (CA)

(72) Inventors: Jianping Lu, Ottawa (CA); Zhiyi Zhang, Ottawa (CA); Ye Tao, Ottawa (CA)

(73) Assignee: National Research Council of Canada, Ottawa (CA)

( * ) Notice: Subject to any disclaimer, the term of this patent is extended or adjusted under 35 U.S.C. 154(b) by 881 days.

(21) Appl. No.: 17/608,210

(22) PCT Filed: May 1, 2020

(86) PCT No.: PCT/CA2020/050581
§ 371 (c)(1),
(2) Date: Nov. 2, 2021

(87) PCT Pub. No.: WO2020/220138
PCT Pub. Date: Nov. 5, 2020

(65) Prior Publication Data
US 2022/0204718 A1    Jun. 30, 2022

Related U.S. Application Data

(60) Provisional application No. 63/010,865, filed on Apr. 16, 2020, provisional application No. 62/841,897, filed on May 2, 2019.

(51) Int. Cl.
*C08J 9/28* (2006.01)
*C08J 9/00* (2006.01)

(52) U.S. Cl.
CPC ............... *C08J 9/28* (2013.01); *C08J 9/0061* (2013.01); *C08J 9/0085* (2013.01); *C08J 2201/0502* (2013.01); *C08J 2205/026* (2013.01); *C08J 2351/10* (2013.01); *C08J 2401/02* (2013.01)

(58) Field of Classification Search
CPC .............. C08F 220/14; C08F 220/1804; C08F 230/085; C08J 9/0061; C08J 9/0085; C08J 9/28; C08J 2201/05; C08J 2201/0502; C08J 2205/026; C08J 2351/10; C08J 2401/02; C08L 43/04; C09D 143/04
See application file for complete search history.

(56) References Cited

U.S. PATENT DOCUMENTS

| | | | |
|---|---|---|---|
| 8,067,478 B1 | 11/2011 | Meador et al. | |
| 8,592,496 B2 | 11/2013 | Wu et al. | |
| 2005/0192366 A1 | 9/2005 | Ou et al. | |
| 2018/0079944 A1 * | 3/2018 | Trifu | C08K 5/053 |
| 2019/0309134 A1 * | 10/2019 | Rezaei | C01B 33/1585 |

FOREIGN PATENT DOCUMENTS

| | | | | |
|---|---|---|---|---|
| EP | 1879690 | | 5/2012 | |
| WO | WO2005/0098553 | | 10/2005 | |
| WO | WO2006/126232 | | 11/2006 | |
| WO | WO-2017049021 A1 * | | 3/2017 | B82Y 30/00 |
| WO | WO2017/194918 | | 11/2017 | |

OTHER PUBLICATIONS

B.N. Nguyen, M.A.B. Meador, A. Medoro, V. Arendt, "Elastic Behavior of methyltrimethoxysilane based aerogels reinforced with tri-isocyanate" ACS Appl. Mater. Interfaces. 2010, 2, 1430-1443.
Y. Duan, S.C. Jana, B. Lama, M.P. Espe, "Self-crosslinkable poly-(urethane urea)-reinforced silica aerogels" RSC Adv. 2015, 5, 71551-71558.

(Continued)

*Primary Examiner* — John M Cooney
(74) *Attorney, Agent, or Firm* — Smart & Biggar LP; Michael Fenwick

(57) ABSTRACT

The present application relates to copolymer-silica hybrid aerogels as well as methods for the preparation thereof. The methods comprise hydrolyzing a silica precursor in an organic solvent to obtain a partially polymerized silica wet gel, reacting the partially polymerized silica wet gel with a copolymer of Formula (II) to obtain a copolymer-silica hybrid wet gel, reacting the copolymer-silica hybrid wet gel with a surface passivation agent and removing solvent from the copolymer-silica hybrid wet gel to obtain the copolymer-silica hybrid aerogel. The mechanical properties of the copolymer-silica hybrid aerogels can be further improved by blending cellulose nanofibrils into the hybrid aerogels. (II)

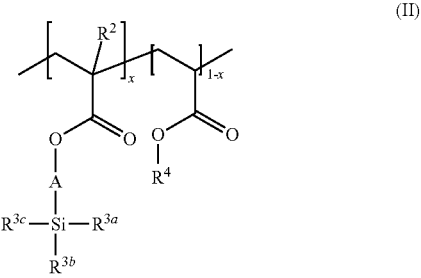

12 Claims, 3 Drawing Sheets

(56) References Cited

OTHER PUBLICATIONS

A. Katti, N. Shimpi, S. Roy, H.B. Lu, E.F. Fabrizio, A. Dass, L.A. Capadona and N. Leventis, "Chemical, physical, and mechanical characterization of isocyanate cross-linked amine-modified silica aerogels" Chem. Mater. 2006, 18, 285-296.

N. Leventis, C. Sotiriou-Leventis, G.H. Zhang, A.M.M. Rawashdeh, "Nanoengineering Strong Silica Aerogels" Nano Lett., 2002, 2, 957-960.

M.A.B. Meador, L.A. Capadona, L. McCorkle, D.S. Papadopoulos and N. Leventis, "Structure-property relationships in porous 3D nanostructures as a function of preparation conditions: Isocyanate cross-linked silica aerogels" Chem. Mater., 2007, 19, 2247-2260.

Guo, B.N. Nguyen, L. Li, M.A.B. Meador, D.A. Scheiman, M. Cakmak, "Clay reinforced polyimide/silica hybrid aerogel" J. Mater. Chem. A, 2013, 1, 7211-7221.

L. Li, B. Yalcin, B.N. Nguyen, M.A.B. Meador, M. Cakmak, "Flexible nanofiber-reinforced aerogel (xerogel) synthesis, manufacture, and characterization" ACS Appl. Mater. Interfaces, 2009, 1, 2491-2501.

J.H. Harreld, B. Dunn, J.I. Zink, "Effects of organic and inorganic network development on the optical properties of ORMOSILs" J. Mater. Chem., 1997, 7, 1511-1517.

B.K. Coltrain, C.J.T. Landry, J.M. O'Reilly, A.M. Chamberlain, G.A. Rakes, U.S. Sedita, L.W. Kelts, M.R. Landry, V.K. Long, "Role of trialkoxysilane functionalization in the preparation of organic-inorganic composites" Chem. Mater. 1993, 5, 1445-1455.

F. Bauer, H.-J. Gläsel, U. Decker, H. Ernst, A. Freyera, E. Hartmann, V. Sauerland, R. Mehnert, "Trialkoxysilane grafting onto nanoparticles for the preparation of clear coat polyacrylate systems with excellent scratch performance" Prog. Org. Coat. 2003, 47, 147-153.

A. Fidalgo, J.P.S. Farinha, J.M.G. Martinho, M.E. Rosa, L.M. Ilharco, "Hybrid silica/polymer aerogels dried at ambient pressure" Chem. Mater. 2007, 19, 2603-2609.

A. Demilecamps, G. Reichenauer, A. Rigacci, T. Budtova, "Cellulose-silica composite aerogels from "one-pot" synthesis" Cellulose, 2014, 21, 2625-2636.

J. Feng, D. Le, S.T. Nguyen, V.T.C. Nien, D. Jewell, H.M. Duong, "Silica-cellulose hybrid aerogels for thermal and acoustic insulation applications" Colloids and Surfaces, A: Physicochemical and Engineering Aspects, 2016, 506, 298-305.

S. Zhao, Z. Zhang, G. Sebe, R. Wu, R. Rudder; V. Rivera P. Tingaut, M.M. Koebel, "Multiscale Assembly of Superinsulating Silica Aerogels Within Silylated Nanocellulosic Scaffolds: ImprovedMechanical Properties Promoted by Nanoscale Chemical Compatibilization" Advanced Functional Materials 2015, 25, 2326-2334.

Martin, L. et al. "Organo-modified silica aerogels and implications for material hydrophobicityproperties" Journal of Materials Chemistry 2008, 18, 207-213.

\* cited by examiner

COPOLYMER-SILICA HYBRID AEROGELS AND METHODS FOR THE PREPARATION THEREOF

CROSS-REFERENCE TO RELATED APPLICATIONS

The present application is a U.S. national phase entry of PCT/CA2020/050581, filed May 1, 2020 which claims the benefit of priority from co-pending applications, U.S. provisional application No. 62/841,897, filed May 2, 2019, and U.S. provisional application No. 63/010,865, filed Apr. 16, 2020, the contents of which are incorporated herein by reference in their entirely.

FIELD

The present application relates to copolymer-silica hybrid aerogels as well as methods for the preparation thereof.

BACKGROUND

Aerogels are a class of continuous, porous solid materials which are characterized by nanometer size particles and pores with a porosity (non-solid volume) of no less than about 50%. Aerogels have been made from a wide variety of materials, such as but not limited to silica, carbon, polymer, metal and metal oxides. Among them, silica-based aerogels are the most common type of aerogels, and the most extensively studied and used.

Silica aerogels can have useful thermal insulation properties, having an extremely low thermal conductivity: for example, from 0.03 W/(mK) under atmospheric pressure down to 0.004 W/(mK) under modest vacuum.

Aerogels also find applications, for example, in construction, daylighting for building, oil and gas, energy storage, filtration, and/or carbon capture. However, silica aerogels are too fragile for many applications, and are easily damaged by water. Some means for preparing polymer reinforced silica aerogels with improved mechanical properties have been reported.[1] For example, polyurethanes have been used to improve the toughness of hybrid silica aerogel due to their good flexibility.[1[d],2] However, the decomposition temperatures of polyurethanes are relatively low, ranging from about 150° C. to about 200° C. and it is desirable for a significant number of applications to have stability remain at temperatures above about 250° C. Polyimides are a class of thermally stable polymers. However, aerogels reinforced with polyimides have limited flexibility[h] and for many applications it is desirable to have a more flexible or elastic material. Trimethoxysilane-modified polymers have been used as adhesion promotors for bonding thermoplastics with glass or hydrophilic minerals. For example, trialkoxysilane-modified polymethylmethacrylate (PMMA) has been employed to prepare organic-inorganic hybrid materials with optical transparency.[3] However, such systems may lack desirable elastic properties. To realize soft and flexible microdomains in a hybrid aerogel, Fidalgo et al. added soft polymer latex to the silica network to absorb mechanical stress.[4] However, the resulting hybrid aerogel was not transparent due to the light scattering by the latex particles.

SUMMARY

In the examples reported herein below, polyacrylate copolymers were used to prepare transparent copolymer-silica hybrid aerogels that were of high porosity and had useful mechanical properties.

Accordingly, the present application includes a method of preparing a copolymer-silica hybrid aerogel, the method comprising:

(a) hydrolyzing and condensing a silica precursor of Formula (I):

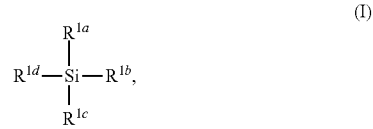

wherein $R^{1a}$, $R^{1b}$, $R^{1c}$ and $R^{1d}$ are each independently a hydrolysable group, in an organic solvent to obtain a partially polymerized silica wet gel;

(b) reacting the partially polymerized silica wet gel with a copolymer of Formula (II):

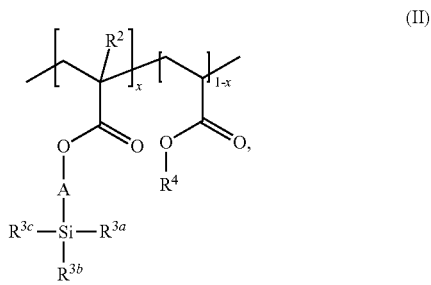

wherein
$R^2$ is H or methyl;
$R^{3a}$, $R^{3b}$ $R^{3c}$ are each independently a hydrolysable group;
$R^4$ is chosen from a substituted or unsubstituted alkyl group, a substituted or unsubstituted cycloalkyl group, a substituted or unsubstituted aryl group and a substituted or unsubstituted heteroaryl group;
A is $C_{2-10}$ alkylene; and
x is a molar fraction of from 0.1 to 0.95,
to obtain a copolymer-silica hybrid wet gel;
(c) reacting the copolymer-silica hybrid wet gel with a surface passivation agent; and
(d) removing solvent from the copolymer-silica hybrid wet gel to obtain the copolymer-silica hybrid aerogel.

The present application also includes a copolymer-silica hybrid aerogel comprising silica nanoparticles linked together by a copolymer of Formula (V):

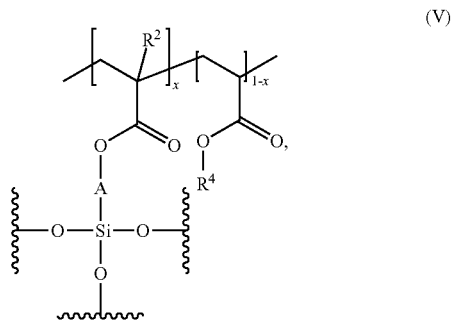

wherein

R² is H or methyl;

R⁴ is chosen from a substituted or unsubstituted alkyl group, a substituted or unsubstituted cycloalkyl group, a substituted or unsubstituted aryl group and a substituted or unsubstituted heteroaryl group;

A is $C_{2-10}$ alkylene; and x is a molar fraction of from 0.1 to 0.95; and wherein the surface of the copolymer-silica hybrid aerogel is passivated.

The present application also includes a copolymer-silica hybrid aerogel containing 1-5% by weight of cellulose nanofibrils (CNFs). The commercially available cellulose nanofibrils dispersed in water can be directly used. Cellulose nanofibrils typically have a diameter ranging from 5 nm to 20 nm and a length ranging from 1 to several micrometers.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
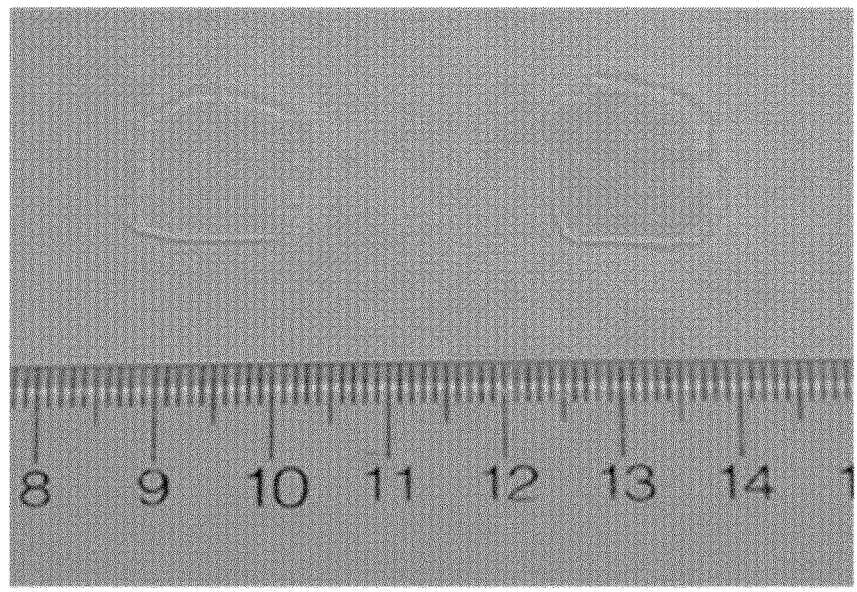
FIG. 1 is a photograph of exemplary transparent polymer-reinforced aerogel films according to an embodiment of the present application. Ruler shows scale in centimeters.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise.

The term "suitable" as used herein means that the selection of specific reagents or conditions will depend on the reaction being performed and the desired results, but none-the-less, can generally be made by a person skilled in the art once all relevant information is known.

The term "halo" as used herein refers to a halogen atom and includes F, Cl, Br and I.

The term "alkyl" as used herein, whether it is used alone or as part of another group, means straight or branched chain, saturated alkyl groups. The number of carbon atoms that are possible in the referenced alkyl group are indicated by the numerical prefix "$Cn_{n1-n2}$". For example, the term $C_{2-10}$ alkyl means an alkyl group having 2, 3, 4, 5, 6, 7, 8, 9 or 10 carbon atoms.

The term "alkylene" as used herein, whether it is used alone or as part of another group, means straight or branched chain, saturated alkylene groups. The number of carbon atoms that are possible in the referenced alkylene group are indicated by the numerical prefix "$C_{n1-n2}$". For example, the term $C_{2-10}$ alkylene means an alkylene group having 2, 3, 4, 5, 6, 7, 8, 9 or 10 carbon atoms.

The term "alkoxy" as used herein, whether it is used alone or as part of another group, means a group having the structure —O-alkyl. The number of carbon atoms that are possible in the referenced alkoxy group are indicated by the numerical prefix "$C_{n1-n2}$". For example, the term $C_{1-2}$alkoxy means an alkoxy group having 1 or 2 carbon atoms.

The term "carbonyl" as used herein, whether it is used alone or as part of another group, means an alkyl group having one or more oxo (=O) substituents. The number of carbon atoms that are possible in the referenced carbonyl group are indicated by the numerical prefix "$C_{n1-n2}$". For example, the term $C_{1-20}$carbonyl means a carbonyl group having 1, 2, 3, 4, 5, 6, 7, 8, 9, 10, 11, 12, 13, 14, 15, 16, 17, 18, 19 or 20 carbon atoms.

The term "aryl" as used herein, whether it is used alone or as part of another group, refers to cyclic groups that contain at least one aromatic ring.

The term "aryloxy" as used herein, whether it is used alone or as part of another group, means a group having the structure —O-aryl.

The term "heteroaryl" as used herein refers to cyclic groups that contain at least one aromatic ring and at least one heteroatom, such as N, O and/or S. The number of atoms that are possible in the referenced heteroaryl group are indicated by the numerical prefix $C_{n1-n2}$. For example, the term $C_{4-14}$heteroaryl means an aryl group having 4, 5, 6, 7, 8, 9, 10, 11, 12, 13 or 14 carbon atoms and at least one atom that is a heteroatom, such as N, O and/or S.

The term "cycloalkyl" as used herein, whether it is used alone or as part of another group, means a mono- or bicyclic, saturated cycloalkyl group. The number of carbon atoms that are possible in the referenced cycloalkyl group are indicated by the numerical prefix "$C_{n1-n2}$". For example, the term $C_{3-30}$cycloalkyl means a cycloalkyl group having 3, 4, 5, 6, 7, 8, 9, 10, 11, 12, 13, 14, 15, 16, 17, 18, 19, 20, 21, 22, 23, 24, 25, 26, 27, 28, 29 or 30 carbon atoms. When a cycloalkyl group contains more than one cyclic structure or rings, the cyclic structures are fused, bridged, spiro connected or linked by a single bond. A first cyclic structure being "fused" with a second cyclic structure means the first cyclic structure and the second cyclic structure share at least two adjacent atoms therebetween. A first cyclic structure being "bridged" with a second cyclic structure means the first cyclic structure and the second cyclic structure share at least two non-adjacent atoms therebetween. A first cyclic structure being "spiro connected" with a second cyclic structure means the first cyclic structure and the second cyclic structure share one atom there between.

The expression "proceed to a sufficient extent" as used herein with reference to the reactions or method steps disclosed herein means that the reactions or method steps proceed to an extent that conversion of the starting material or substrate to product is maximized. Conversion may be maximized when greater than about 5, 10, 15, 20, 25, 30, 35, 40, 45, 50, 55, 60, 65, 70, 75, 80, 85, 90, 95 or 100% of the starting material or substrate is converted to product.

II. Methods

In the examples reported herein below, polyacrylate copolymers were used to prepare transparent copolymer-silica hybrid aerogels that were of high porosity and had useful mechanical properties.

Accordingly, the present application includes a method of preparing a copolymer-silica hybrid aerogel, the method comprising:
(a) hydrolyzing and condensing a silica precursor of Formula (I):

$$R^{1d}-\underset{\underset{R^{1c}}{|}}{\overset{\overset{R^{1a}}{|}}{Si}}-R^{1b}, \quad (I)$$

wherein $R^{1a}$, $R^{1b}$, $R^{1c}$ and $R^{1d}$ are each independently a hydrolysable group,
in an organic solvent to obtain a partially polymerized silica wet gel;
(b) reacting the partially polymerized silica wet gel with a copolymer of Formula (II):

(II)

wherein
$R^2$ is H or methyl;
$R^{3a}$, $R^{3b}$ and $R^{3c}$ are each independently a hydrolysable group;
$R^4$ is chosen from a substituted or unsubstituted alkyl group, a substituted or unsubstituted cycloalkyl group, a substituted or unsubstituted aryl group and a substituted or unsubstituted heteroaryl group;
A is $C_{2-10}$alkylene; and
x is a molar fraction of from 0.1 to 0.95,
to obtain a copolymer-silica hybrid wet gel;
(c) reacting the copolymer-silica hybrid wet gel with a surface passivation agent; and
(d) removing solvent from the copolymer-silica hybrid wet gel to obtain the copolymer-silica hybrid aerogel.
(e) For cellulose nanofibrils reinforced copolymer-silica hybrid aerogel, commercially available cellulose nanofibrils aqueous paste in different amount was added into the silica precursor as described in Step a. After stirring for 15 min, a viscous sol-gel was obtained. Then, the processes b-d were repeated to obtained the final hybrid aerogel.

The person skilled in the art would be able to readily select suitable hydrolysable groups for $R^{1a}$, $R^{1b}$, $R^{1c}$ and $R^{1d}$ and $R^{3a}$, $R^{3b}$ and $R^{3c}$. For example, it would be appreciated by the skilled person that halo groups such as chloro would not be suitable because acids will be generated upon reaction with water. In contrast, the skilled person would appreciate that the hydrolysable group can be a suitable alkoxy group. Accordingly, in an embodiment, $R^{1a}$, $R^{1b}$, $R^{1c}$ and $R^{1d}$ are each independently a suitable alkoxy group. In another embodiment, $R^{1a}$, $R^{1b}$, $R^{1c}$ and $R^{1d}$ are each independently a $C_{1-3}$alkoxy group. In another embodiment, $R^{1a}$, $R^{1b}$, $R^{1c}$ and $R^{1d}$ are each independently a $C_{1-2}$alkoxy group. In a further embodiment, $R^{1a}$, $R^{1b}$, $R^{1c}$ and $R^{1d}$ are all each —$OCH_3$ or all each —$OCH_2CH_3$. In another embodiment, $R^{1a}$, $R^{1b}$, $R^{1c}$ and $R^{1d}$ are all each —$OCH_3$. In another embodiment, $R^{1a}$, $R^{1b}$, $R^{1c}$ and $R^{1d}$ are all each —$OCH_2CH_3$. In an embodiment, $R^{3a}$, $R^{3b}$ and $R^{3c}$ are each independently a suitable alkoxy group. In another embodiment, $R^{3a}$, $R^{3b}$ and $R^{3c}$ are each independently a $C_{1-3}$alkoxy group. In another embodiment, $R^{3a}$, $R^{3b}$ and $R^{3c}$ are each independently a $C_{1-2}$alkoxy group. In a further embodiment, $R^{3a}$, $R^{3b}$ and $R^{3c}$ are all each —$OCH_3$ or all each —$OCH_2CH_3$. In another embodiment, $R^{3a}$, $R^{3b}$ and $R^{3c}$ are all each —$OCH_3$. In another embodiment, $R^{3a}$, $R^{3b}$ and $R^{3c}$ are all each —$OCH_2CH_3$.

The conditions for hydrolyzing and condensing the silica precursor of Formula (I) in the organic solvent to obtain the partially polymerized silica wet gel are any suitable conditions. In an embodiment, the silica precursor is hydrolyzed and condensed in the organic solvent in the presence of a catalyst. The catalyst is any suitable catalyst, the selection of which can be made by a person skilled in the art. In an embodiment, the catalyst is ammonium hydroxide. The organic solvent is any suitable organic solvent or mixture thereof, the selection of which can be made by a person skilled in the art. In an embodiment, the organic solvent is a mixture of tetrahydrofuran and ethanol. In an embodiment, the conditions for hydrolyzing and condensing the silica precursor of Formula (I) in the organic solvent to obtain the partially polymerized silica wet gel comprise adding the catalyst (e.g. an aqueous solution comprising ammonia) to a solution comprising the silica precursor of Formula (I) in the organic solvent and stirring for a time and at a temperature for the conversion of the silica precursor of Formula (I) to the partially polymerized silica wet gel to proceed to a sufficient extent. The time is selected such that it is long enough to allow the inorganic domains to grow to a useful size but not so long such that the whole system is gelled. In an embodiment, silica precursor is hydrolyzed and condensed in the organic solvent for a time of from about 45 minutes to about 60 minutes, while stirring. In another embodiment, the temperature is from about 15° C. to about 40° C. or room temperature (e.g. about 23° C.).

The conditions for reacting the partially polymerized silica wet gel with the copolymer of Formula (II) are any suitable conditions. In an embodiment, the conditions comprise adding the copolymer of Formula (II) to the partially polymerized silica wet gel and stirring for a time and at a temperature for the reaction of the partially polymerized silica wet gel and the copolymer of Formula (II) to proceed to a sufficient extent (for example, a time of about 1 minute to about 15 minutes or about 5 minutes at a temperature of from about 15° C. to about 40° C. or room temperature) then transferring the mixture into a mold and allowing the mixture to rest for a time, at a temperature and under suitable conditions for the conversion to the copolymer-silica hybrid wet gel to proceed to a sufficient extent, for example, a time of about 12 hours to about 36 hours or about 24 hours at a temperature of from about 15° C. to about 40° C. or room temperature, for example, under an atmosphere of saturated alcohol vapor.

The copolymer of Formula (II) can be prepared by any suitable method, the selection of which can be made by a person skilled in the art or alternatively, in some embodiments, may be obtained from a commercial supplier. In an embodiment, the copolymer of Formula (II) is prepared by a method comprising radical polymerization of a mixture of a monomer of the Formula (III) and a monomer of the Formula (IV) in an anhydrous solvent:

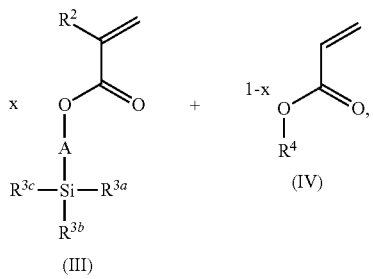

wherein $R^2$, $R^{3a}$, $R^{3b}$, $R^{3c}$, $R^4$, A and x are as defined herein.

The conditions for radical polymerization of the mixture of the monomer of the Formula (III) and the monomer of the Formula (IV) in the anhydrous solvent are any suitable conditions to obtain linear copolymers of Formula (II). In an embodiment, the conditions comprise mixing the monomer of the Formula (III) and the monomer of the Formula (IV) in a suitable anhydrous solvent (for example, tetrahydrofuran (THF), N-methyl-2-pyrrolidone (NMP) or dimethylformamide (DMF)) in the presence of a suitable radical initiator (e.g. azobisisobutyronitrile, AIBN) under inert (e.g. argon) atmosphere at a low temperature (e.g. −50° C.) then allowing the mixture to warm up and stir for a time and at a temperature for the radical polymerization of the monomers to the copolymer of Formula (II) to proceed to a sufficient extent, for example, a time about 16 hours to about 24 hours or about 20 hours at a temperature of about 55° C. to about 75° C. or about 65° C. It will be appreciated by the person skilled in the art that the molecular weight of the copolymer will depend, for example, on the amount of the initiator. The amount of initiator is typically selected to obtain copolymers having an average number of repeating units of at least about 100. In an embodiment, the copolymer of Formula (II) is substantially devoid of oligomers.

In an embodiment, $R^2$ is $CH_3$. In another embodiment, $R^2$ is H.

In an embodiment, $R^4$ is unsubstituted. In another embodiment, $R^4$ is substituted. In an embodiment, the substituents are one or more of fluoro, oxo (=O), thio (=S), $C_{1-30}$alkyl, $C_{3-30}$cycloalkyl, $C_{6-20}$aryl, $C_{1-8}$alkylene$C_{6-20}$aryl, $C_{1-8}$alkylene-$C_{4-14}$heteroaryl, $C_{1-30}$alkoxy, $C_{6-20}$aryloxy, $-N(C_{1-10}alkyl)_2$ or $C_{1-20}$carbonyl. In another embodiment, $R^4$ is unsubstituted $C_{1-30}$alkyl, $C_{1-30}$alkoxy, $C_{3-30}$cycloalkyl, $C_{6-18}$aryl or $C_{4-14}$heteroaryl. In a further embodiment, $R^4$ is unsubstituted $C_{2-10}$alkyl, $C_{2-10}$alkoxy, or $C_{3-10}$cycloalkyl. In another embodiment, the aryl is phenyl or fluorenyl. In another embodiment, the heteroaryl is pyridinyl, pyrimidinyl, pyrazinyl, triazinyl, pyrrolyl, pyrazolyl, imidazolyl, (1,2,3)-triazolyl, (1,2,4)-triazolyl, tetrazolyl, furyl, thienyl, or thiazolyl. In an embodiment, $R^4$ is $C_{2-2}$alkyl. In another embodiment, $R^4$ is $C_{2-10}$alkyl. In a further embodiment of the present application $R^4$ is n-butyl.

In an embodiment, A is $C_{2-6}$alkylene. In another embodiment, A is $C_{2-4}$alkylene. In a further embodiment, A is $-(CH_2)_3-$.

In an embodiment, x is from 0.2 to 0.5. In another embodiment, x is from 0.3 to 0.45. In a further embodiment, x is 0.3 or 0.45. In another embodiment, x is 0.3. In a further embodiment, x is 0.45.

The conditions for reacting the copolymer-silica hybrid wet gel with a surface passivation agent are any suitable conditions. In an embodiment, the conditions comprise adding a solution comprising the surface passivation agent (e.g. an about 5 vol % to about 20 vol % or about 10 vol % solution of the surface passivation agent in a suitable solvent such as anhydrous isopropanol) to the copolymer-silica wet gel and reacting for a time and at a temperature for the surface passivation of the copolymer-silica hybrid wet gel to proceed to a sufficient extent, for example, a time of about 24 hours to about 4 days or about 2 days at a temperature of from about 15° C. to about 40° C. or room temperature, followed by washing in fresh isopropanol (e.g. 2 times at about 24 hour intervals). Suitable surface passivation agents are known to the person skilled in the art. In an embodiment, the surface passivation agent is hexamethyldisilazane.

The solvent is removed from the copolymer-silica hybrid wet gel using any suitable conditions to obtain an aerogel thereof. In an embodiment, the solvent is removed by a method comprising $CO_2$ supercritical drying.

III. Aerogels and Uses

The use of a flexible low-$T_9$ 3-(trimethoxysilyl)propyl methacrylate-butyl acrylate (MAPTMS-BA) copolymer was found to impart useful flexibility to the final hybrid aerogel. Transparent aerogel samples with useful mechanical properties were obtained by using a supercritical drying process.

Accordingly, the present application also includes a copolymer-silica hybrid aerogel comprising silica nanoparticles linked together by a copolymer of Formula (V):

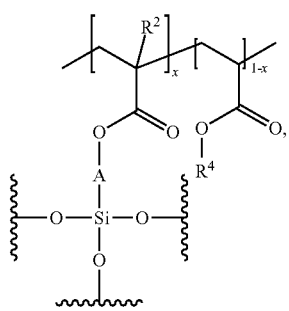

(V)

wherein $R^2$ is H or methyl;

$R^4$ is chosen from a substituted or unsubstituted alkyl group, a substituted or unsubstituted cycloalkyl group, a substituted or unsubstituted aryl group and a substituted or unsubstituted heteroaryl group;

A is $C_{2-10}$alkylene; and x is a molar fraction of from 0.1 to 0.95; and wherein the surface of the copolymer-silica hybrid aerogel is passivated.

It will be appreciated by a person skilled in the art that the oxygen atoms attached to the silicon atom in the copolymer of Formula (V) are shared between the silicon atom shown in the above structure and another atom (e.g. another silicon atom) in the copolymer-silica hybrid aerogel.

In an embodiment, the copolymer-silica hybrid aerogel is obtained by a method of preparing a copolymer-silica hybrid aerogel of the present application.

In an embodiment, $R^2$ is $CH_3$. In another embodiment, $R^2$ is H.

In an embodiment, $R^4$ is unsubstituted. In another embodiment, $R^4$ is substituted. In an embodiment, the substituents are one or more of fluoro, oxo (=O), thio (=S), $C_{1-30}$alkyl, $C_{3-30}$cycloalkyl, $C_{6-20}$aryl, $C_{1-8}$alkyleneC$_{6-20}$aryl, $C_{1-8}$alkyleneC$_{4-14}$heteroaryl $C_{1-30}$alkoxy, $C_{6-20}$aryloxy, —N($C_{1-10}$alkyl)$_2$ or $C_{1-20}$carbonyl. In another embodiment, $R^4$ is unsubstituted $C_{1-30}$alkyl, $C_{1-30}$alkoxy, $C_{3-30}$cycloalkyl, $C_{6-18}$aryl or $C_{4-14}$heteroaryl. In a further embodiment, $R^4$ is unsubstituted $C_{2-10}$alkyl, $C_{2-10}$alkoxy, or $C_{3-10}$cycloalkyl. In another embodiment, the aryl is phenyl or fluorenyl. In another embodiment, the heteroaryl is pyridinyl, pyrimidinyl, pyrazinyl, triazinyl, pyrrolyl, pyrazolyl, imidazolyl, (1,2,3)-triazolyl, (1,2,4)-triazolyl, tetrazolyl, furyl, thienyl, or thiazolyl. In an embodiment, $R^4$ is $C_{2-20}$alkyl. In another embodiment, $R^4$ is $C_{2-10}$alkyl. In a further embodiment of the present application $R^4$ is n-butyl.

In an embodiment, A is $C_{2-6}$alkylene. In another embodiment, A is $C_{2-4}$alkylene. In a further embodiment, A is —(CH$_2$)$_3$—.

In an embodiment, x is from 0.2 to 0.5. In another embodiment, x is from 0.3 to 0.45. In a further embodiment, x is 0.3 or 0.45. In another embodiment, x is 0.3. In a further embodiment, x is 0.45.

The surface is passivated by any suitable surface passivation agent. Suitable surface passivation agents are known to the person skilled in the art. In an embodiment, the surface passivation agent is hexamethyldisilazane, HMDS (i.e. the surface is passivated with —OSiMe$_3$ groups from the HMDS).

In an embodiment, the copolymer-silica hybrid aerogel has a porosity of from about 50% to about 95%. In another embodiment, the copolymer-silica hybrid aerogel has a porosity of from about 75% to about 95%. In another embodiment, the copolymer-silica hybrid aerogel has a porosity of from about 85% to about 95%, about 89% or about 90%.

In an embodiment, the content of the copolymer of Formula (V) in the polymer-silica hybrid aerogel is from about 15 wt % to about 50 wt %, based on the total weight of the copolymer of Formula (V) and the silica nanoparticles. In another embodiment, the content of the copolymer of Formula (V) in the copolymer-silica hybrid aerogel is from about 20 wt % to about 30 wt % or about 26 wt %, based on the total weight of the copolymer of Formula (V) and the silica nanoparticles.

In an embodiment, the content of the cellulose nanofibrils in the polymer-silica hybrid aerogel is from about 1 wt % to about 5 wt %, based on the total weight of the cellulose nanofibrils, copolymer of Formula (V), and the silica nanoparticles.

The present application also includes a use of a copolymer-silica hybrid aerogel of the present application in construction, daylighting, a thermoelectronic device and/or a gas sensor.

The following non-limiting examples are illustrative of the present application:

EXAMPLES

Example 1: Functionalized Polyacrylate Copolymer-Silica Hybrid Aerogels

I. Materials, Methods and Results (a) Synthesis of Trialkoxysilane Functionalized Copolymers Trialkoxysilane-functionalized polyacrylate copolymers were prepared by radical polymerization of different ratios of monomers (Scheme 1, copolymers 1a and 1b). For comparative purposes, a trialkoxysilane-functionalized polymethacrylate copolymer was also prepared (Scheme 1, copolymer 2).

Scheme 1. Chemical structure of acrylate and methacrylate copolymers.

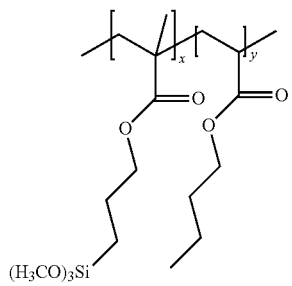

1a: x = 0.45; y = 0.55
1b: x = 0.3; y = 0.7

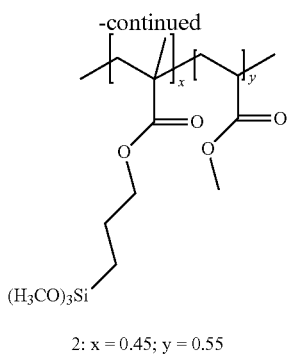

2: x = 0.45; y = 0.55

The general synthetic route for the preparation of trialkoxysilane functionalized polyacrylates is shown in Scheme 2.

Scheme 2. General preparation of trialkoxysilane-functionalized polyacrylates.

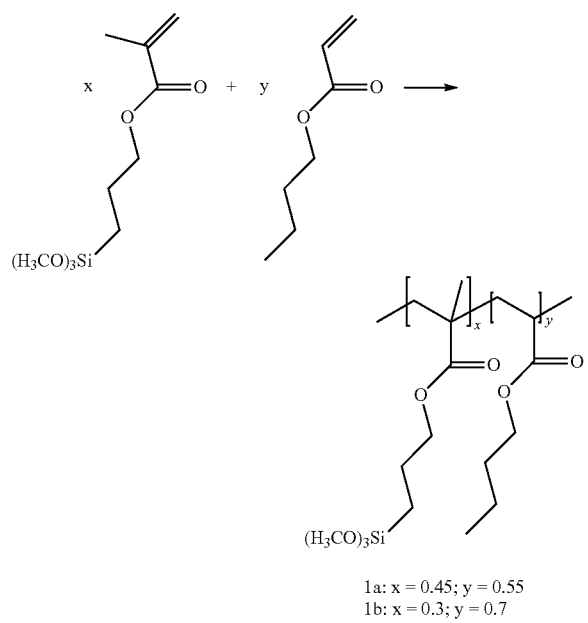

1a: x = 0.45; y = 0.55
1b: x = 0.3; y = 0.7

In general, a 3-neck flask equipped with a condenser and a magnetic stirring bar was flushed with argon 3 times. Then, radical initiator AIBN, the desired amount of butyl acrylate (or methyl methacrylate for the comparative trialkoxysilane-functionalized polymethacrylate copolymer), the desired amount of 3-(trimethoxysilyl)propyl methacrylate and anhydrous THF were added under argon. The total monomer concentration was about 0.28 g/ml, and the amount of AIBN was 0.4 wt % relative to the total monomer amount. The resulting solution was cooled to −50° C. and degassed with a Schlenk technique. Then, the cold bath was removed. The polymerization solution was heated up to 65° C., and stirred at this temperature under argon for 20 h. The obtained viscous solution was stored in a refrigerator.

Comparative copolymer 2 only had a shelf life of 2 weeks. In contrast, copolymer 1a had a shelf life of 1 month and copolymer 1b had a shelf life of 2 months under such storage conditions.

(b) Preparation of Organic-Inorganic Hybrid Wet Gel

Tetraethyl orthosilicate (TEOS) or tetramethyl orthosilicate (TMOS) was hydrolyzed and then condensed to form sol gel using ammonia aqueous solution as a catalyst. The concentration of TEOS or TMOS determined the porosity of the final aerogel. As an example, the following percentages generated a hybrid aerogel with a porosity above 90%. To a 15 ml vial were added ethanol (3 ml), THF (3 ml), and TMOS (2 ml) with stirring. Then, water (0.7 ml) and ammonia aqueous solution (1M, 0.06 mL) were added dropwise. After stirring for several minutes, the sol-gel solution became viscous. The whole system gelled within 90 minutes. Typically, the polyacrylate solution was added after the sol-gel solution was stirred for 45 to 60 minutes. The amount of the polymer solution added determined the polymer content in the final hybrid aerogel. For example, with an addition of 1 ml of polymer solution, the polymer content in the aerogel was about 26%. Aerogels were prepared using copolymer 1a with polymer contents of about 27 and 43 wt % and copolymer 1b with polymer contents of about 16, 27 and 43 wt %. After the addition of polymer solution, the resulting viscous mixture was further stirred for 5 minutes and then transferred into Teflon molds which were stored in sealed jars with saturated alcohol vapor. Using the concentrations of TMOS and ammonia catalyst indicated above, gelation typically occurred within 30 minutes after the sol-gel mixture was transferred into the molds. The obtained wet gel films were stored in the sealed jars for aging at room temperature for 24 h. Then, 10 vol % hexamethyldisilazane (HMDS) solution in anhydrous isopropanol was added. The surface passivation reaction was run at room temperature for 2 days. Then, the wet gel films were washed in fresh isopropanol 2 times at 24 h intervals before being dried using supercritical carbon dioxide ($CO_2$) extraction.

(c) Preparation of Organic-Inorganic Hybrid Wet Gel Containing Cellulose nanofibrils The process is quite similar to the one described in [0061] except that cellulose nanofibrils were added. As an example, the following percentages generated a hybrid aerogel containing 1.8 wt % nanocellulose with a porosity of 90%. Commercially available cellulose nanofibrils water paste with 2.7 wt % of nanocellulose was directly used. To a 15 ml vial were added cellulose nanofibrils water paste (0.7 g), ethanol (3 ml), THF (3 ml), and TMOS (2 ml) with stirring. Then, ammonia aqueous solution (1M, 0.06 mL) were added dropwise. After stirring for several minutes, the sol-gel solution became viscous. The whole system gelled within 75 minutes. Typically, the polyacrylate solution was added after the sol-gel solution was stirred for 15 to 30 minutes. The amount of the polymer solution added determined the polymer content in the final hybrid aerogel. After the addition of polymer solution, the resulting viscous mixture was further stirred for 5 minutes and then transferred into Teflon molds which were stored in sealed jars with saturated alcohol vapor. Gelation typically occurred within 30 minutes after the sol-gel mixture was transferred into the molds. The obtained wet gel films were stored in the sealed jars for aging at room temperature for 24 h. Then, 10 vol % hexamethyldisilazane (HMDS) solution in anhydrous isopropanol was added. The surface passivation reaction was run at room temperature for 2 days. Then, the wet gel films were washed in fresh isopropanol 2 times at 24 h intervals before being dried using supercritical carbon dioxide ($CO_2$) extraction.

(c) $CO_2$ Supercritical Drying to Prepare Organic-Inorganic Hybrid Aerogel Films The $CO_2$ supercritical drying was performed on a Tousimis advanced manual critical point dryer Samdri-pvt-3D. The prepared wet gel films were transferred into a sample holder with a spatula, and then the sample holder was put into the chamber of the supercritical drying facility. To avoid shrinkage and cracking of wet gel films during the transfer process, the chamber was prefilled with some isopropanol. Then, the alcohol was completely replaced by liquid $CO_2$ by passing liquid $CO_2$ through the chamber. Finally, the chamber was heated to 45° C., and the pressure generally reached 1200 psi. The sample was dried under supercritical conditions for 5 minutes. After slow release of $CO_2$, transparent hybrid aerogel films were obtained as shown in FIG. 1. Their bulk density was about 0.22 g/ml, and the calculated skeletal density of the hybrid aerogel was about 2 g/ml. Therefore, the porosity of the obtained hybrid aerogel was about 89%. The copolymer used to obtain the exemplary transparent hybrid aerogel films of FIG. 1 was a random copolymer of 3-(trimethoxysilyl)propyl methacrylate and butyl acrylate (molar ratio 0.3:0.7). 2 ml of TMOS was diluted in 6 ml of the solvent mixture of THF and ethanol (1:2 by volume). The obtained silica sol-gel was mixed with 1 ml of polymer solution in anhydrous THF (about 0.3 g/ml).

(d) Thermal Stability of Hybrid Aerogel

Figure 2:
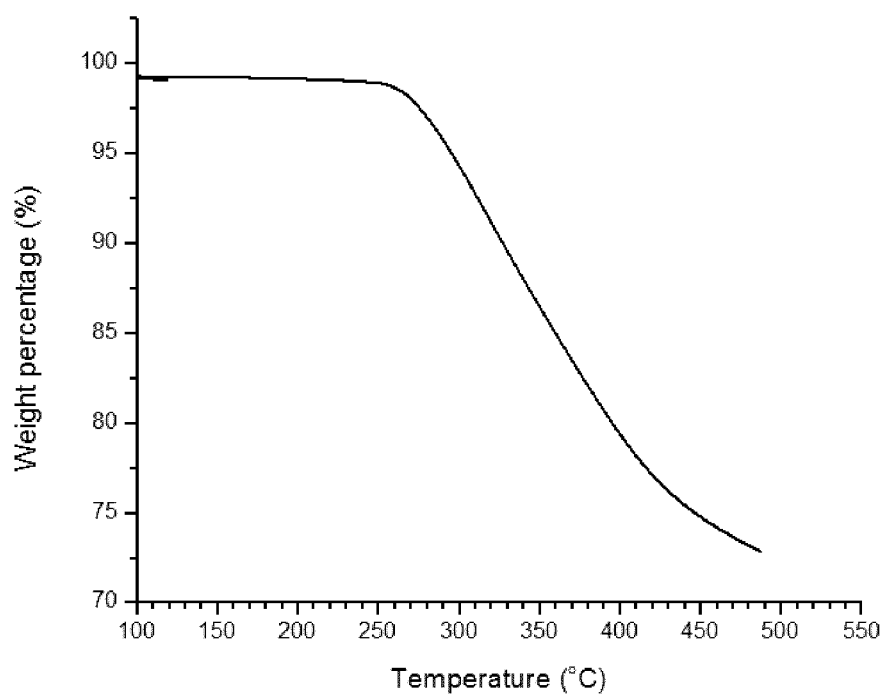
FIG. 2 is a thermogravimetric analysis (TGA) curve of an exemplary hybrid aerogel according to an embodiment of the present application under a nitrogen atmosphere.

Thermogravimetric analysis (TGA) was conducted to evaluate the thermal stability of a polyacrylate-modified silica aerogel obtained using a copolymer as described herein above for the hybrid aerogel films of FIG. 1. The sample was heated to 500° C. under nitrogen at a heating rate of 10° C./min. As can be seen from FIG. 2, the onset decomposition temperature of the hybrid aerogel (corresponding to 1 wt % weight loss) is about 267° C. Even at 500° C., 72.8% of the original weight still remained. This value was in good agreement with the silica content in the hybrid aerogel (72% by weight). After TGA analysis, the aerogel sample was not broken into pieces and kept its original shape.

(e) Other Properties of Hybrid Aerogels

The polyacrylate-modified silica aerogels were observed to be qualitatively significantly more flexible than the comparative methacrylate-modified silica aerogels. The polyacrylate-modified silica aerogels were also observed to float in water without observable decomposition. The hybrid aerogels prepared from copolymer 1b were observed to be more flexible as compared to the corresponding hybrid aerogels prepared with copolymer 1a.

II. Discussion

Figure 3:
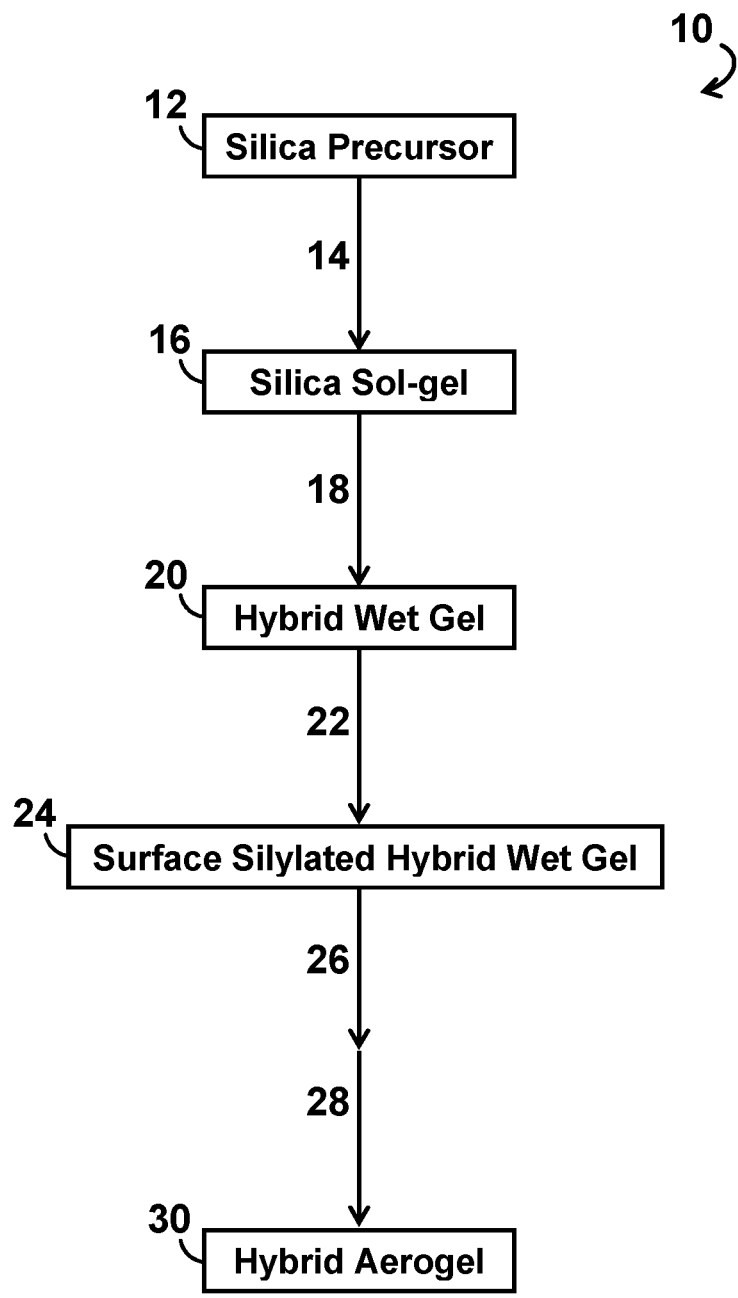
FIG. 3 is a schematic diagram of a method according to an embodiment of the present application.

In this example, a new simple approach to hybrid silica aerogels with desirable mechanical properties was used, as shown in the exemplary method flow diagram in FIG. 3 for the preparation of organic-inorganic hybrid aerogels. Referring to FIG. 3, in the method 10 shown therein, the silica precursor 12 (such as TMOS) was hydrolyzed and condensed 14 using ammonia aqueous solution as a catalyst in THF/EtOH to obtain a partially polymerized silica sol-gel 16. The desired trialkoxysilane-functionalized polyacrylate copolymer was then added 18 to obtain the hybrid wet gel 20. Hexamethyldisilazane was then added 22 to passivate (silylate) the surface and obtain a surface silylated hybrid wet gel 24. The solvent was then exchanged 26 with isopropanol followed by $CO_2$ supercritical drying 28 to obtain the hybrid aerogel 30.

One-pot syntheses of polymer cross-linked silica aerogels have been widely studied.[1a,b] In such methods, polymers and silica networks are formed at the same time. However, it is difficult to achieve a high conversion degree for the organic polymers in such methods because the system becomes highly viscous and organic monomers lost their mobility. In addition, the polymers produced may not have a high molecular weight because the reaction medium (such as alcohol) may affect the polymerization reaction. As a result, only oligomers were obtained.[1a]

In contrast, the present method uses a multi-step preparation procedure. First, high molecular weight trialkoxysilane-functionalized polyacrylates were prepared by radical polymerization in suitable organic solvents, such as anhydrous THF, NMP, and DMF. This method offers a good flexibility in the choice of monomers to tune the physical and mechanical properties of polymers. To afford a good flexibility to the final hybrid aerogel, the polymers used for the reinforcement advantageously have a flexible main chain. In this sense, PMMA is not a good candidate because its main chain is not flexible enough. Polyacrylates are softer materials with low $T_g$s. For example, the $T_g$ of PMMA is about 105° C., while the $T_g$ of poly(butyl acrylate) is as low as −56° C. The molar ratio between alkyl acrylate and trialkoxysilane functionalized acrylate can be adjusted to tune the physical properties and crosslinking density of polyacrylate copolymers.

Second, tetraethyl orthosilicate (TEOS) or tetramethyl orthosilicate (TMOS) was hydrolyzed and then condensed to form inorganic networks in the presence of an ammonia catalyst in a flask. When the silica sol-gel became viscous, polymer solution was added in varied amounts to control the polymer content in the final hybrid aerogel. Since the silica sol-gel was formed before the addition of polymer solution in the present method, the sizes and networks of silica nanoparticles can be controlled by adjusting the precursor concentration and the amount of base catalyst. When the polymer solution was added into the silica sol gel, organic-inorganic phase separated nanostructures naturally formed. In the meanwhile, the covalent bonding between the polymer side chains and silica nanoparticles makes this phase separated nanostructure thermally stable and prevents macro phase separation. As a result, transparent aerogel films can be obtained. After the silica sol gel and polymer solution mixture was stirred for the desired time, the viscous mixture was poured into Teflon molds, which were placed in sealed jars. The mixture gelled quickly and then the wet gel was surface-modified with hexamethyldisilazane (HMDS). This surface passivation agent also played a useful role in the preparation of the hybrid aerogel. For example, a good passivation agent not only terminates the polar SiOH group, but also provides hydrophobicity and/or increases crosslinking density. HMDS efficiently converts polar SiOH groups into hydrophobic $SiOSi(CH_3)_3$ groups.

Finally, the surface-passivated wet gels were dried by $CO_2$ supercritical fluid to produce flexible polymer reinforced silica aerogels. In such hybrid aerogels, silica nanoparticles were chemically linked together by soft high molecular weight polymers, leading to good mechanical properties.

The use of a single hybrid precursor, such as poly(3-(trimethoxysilyl)propyl methacrylate), to prepare transparent organic-inorganic hybrid materials without adding TMOS or TEOS has been reported.[3a,b] However, the present inventors found that the content of inorganic components in this recipe was not high enough (<40 wt %) for the preparation of a high-porosity aerogel. The films deformed during supercritical drying.

The use of cellulose nanofabrils to reinforce silica aerogel has been reported in the literature.[5] However, the present inventors found that the combination of trialkoxysilane-functionalized low-Tg polymers and cellulose nanofabrils provided better mechanical properties.

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS
REFERRED TO IN THE DESCRIPTION

[1] [a] D. L. Ou, G. L. Gould, C. J. Stepanian, US patent publication no. 2005/0192366 A1; [b] M. A. B. Meador, L. A. Capadona, U.S. Pat. No. 8,067,478 B1, 2011; [c] B. N. Nguyen, M. A. B. Meador, A. Medoro, V. Arendt, "Elastic Behavior of methyltrimethoxysilane based aerogels reinforced with tri-isocyanate" ACS Appl. Mater. Interfaces. 2010, 2, 1430-1443; [d] Y. Duan, S. C. Jana, B. Lama, M. P. Espe, "Self-crosslinkable poly(urethane urea)-reinforced silica aerogels" RSC Adv. 2015, 5, 71551-71558; [e] A. Katti, N. Shimpi, S. Roy, H. B. Lu, E. F. Fabrizio, A. Dass, L. A. Capadona and N. Leventis, "Chemical, physical, and mechanical characterization of isocyanate cross-linked amine-modified silica aerogels" Chem. Mater. 2006, 18, 285-296; [f] N. Leventis, C. Sotiriou-Leventis, G. H. Zhang, A. M. M. Rawashdeh, "Nanoengineering Strong Silica Aerogels" Nano Lett., 2002, 2, 957-960; [g]M. A. B. Meador, L. A. Capadona, L. McCorkle, D. S. Papadopoulos and N. Leventis, "Structure-property relationships in porous 3D nanostructures as a function of preparation conditions: Isocyanate cross-linked silica aerogels" Chem. Mater., 2007, 19, 2247-2260; [h] J. Guo, B. N. Nguyen, L. Li, M. A. B. Meador, D. A. Scheiman, M. Cakmak, "Clay reinforced polyimide/silica hybrid aerogel" J. Mater. Chem. A, 2013, 1, 7211-7221.

[2] L. Li, B. Yalcin, B. N. Nguyen, M. A. B. Meador, M. Cakmak, "Flexible nanofiber-reinforced aerogel (xerogel) synthesis, manufacture, and characterization" ACS Appl. Mater. Interfaces, 2009, 1, 2491-2501.

[3] [a] J. H. Harreld, B. Dunn, J. I. Zink, "Effects of organic and inorganic network development on the optical properties of ORMOSILs" J. Mater. Chem., 1997, 7, 1511-1517; [b] B. K. Coltrain, C. J. T. Landry, J. M. O'Reilly, A. M. Chamberlain, G. A. Rakes, J. S. Sedita, L. W. Kelts, M. R. Landry, V. K. Long, "Role of trialkoxysilane functionalization in the preparation of organic-inorganic composites" Chem. Mater. 1993, 5, 1445-1455; [c] F. Bauer, H.-J. Gläsel, U. Decker, H. Ernst, A. Freyera, E. Hartmann, V. Sauerland, R. Mehnert, "Trialkoxysilane grafting onto nanoparticles for the preparation of clear coat polyacrylate systems with excellent scratch performance" Prog. Org. Coat. 2003, 47, 147-153.

[4] A. Fidalgo, J. P. S. Farinha, J. M. G. Martinho, M. E. Rosa, L. M. Ilharco, "Hybrid silica/polymer aerogels dried at ambient pressure" Chem. Mater. 2007, 19, 2603-2609.

[5] [a] A. Demilecamps, G. Reichenauer, A. Rigacci, T. Budtova, "Cellulose-silica composite aerogels from "one-pot" synthesis" Cellulose, 2014, 21, 2625-2636. [b] J. Feng, D. Le, S. T. Nguyen, V. T. C. Nien, D. Jewell, H. M. Duong, "Silica-cellulose hybrid aerogels for thermal and acoustic insulation applications" Colloids and Surfaces, A: Physicochemical and Engineering Aspects, 2016, 506, 298-305. [c] S. Zhao, Z. Zhang, G. Sebe, R. Wu, R. Rudder; V. Rivera P. Tingaut, M. M. Koebel, "Multiscale Assembly of Superinsulating Silica Aerogels Within Sylated Nanocellulosic Scaffolds: ImprovedMechanical Properties Promoted by Nanoscale Chemical Compatibilization" Advanced Functional Materials 2015, 25, 2326-2334.

The invention claimed is:

1. A method of preparing a copolymer-silica-nanocellulose hybrid aerogel, the method comprising:
    (a) hydrolyzing and condensing a silica precursor of Formula (I) in the presence of cellulose nanofibrils:

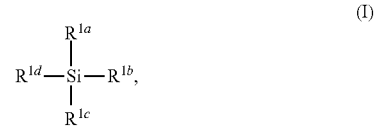

wherein $R^{1a}$, $R^{1b}$, $R^{1c}$ and $R^{1d}$ are each independently a hydrolysable group, in an organic solvent to obtain a partially polymerized silica wet gel;
    (b) reacting the partially polymerized silica wet gel with a copolymer of Formula (II):

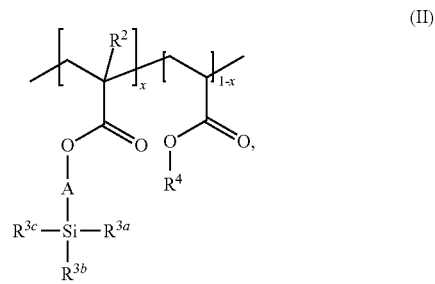

wherein
   $R^2$ is H or methyl;
   $R^{3a}$, $R^{3b}$ and $R^{3c}$ are each independently a hydrolysable group;
   $R^4$ is chosen from a substituted or unsubstituted alkyl group, a substituted or unsubstituted cycloalkyl group, a substituted or unsubstituted aryl group and a substituted or unsubstituted heteroaryl group;
   A is $C_{2-10}$alkylene; and
   x is a molar fraction of from 0.1 to 0.95,
   to obtain a copolymer-silica-nanocellulose hybrid wet gel;
    (c) reacting the copolymer-silica-nanocellulose hybrid wet gel with a surface passivation agent; and
    (d) removing solvent from the copolymer-silica hybrid wet gel to obtain the copolymer-silica-nanocellulose hybrid aerogel.

2. The method of claim 1, wherein the copolymer of Formula (II) is prepared by a method comprising radical polymerization of a mixture of a monomer of the Formula (III) and a monomer of the Formula (IV) in an anhydrous solvent:

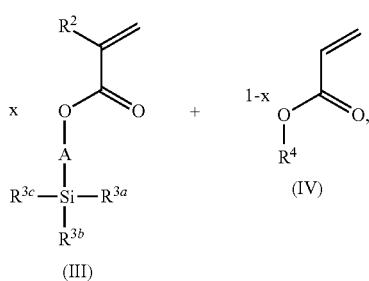

wherein $R^2$, $R^{3a}$, $R^{3b}$, $R^{3c}$, $R^4$, A and x are as defined in claim 1.

3. The method of claim 1, wherein the silica precursor is hydrolyzed and condensed in the organic solvent in the presence of a catalyst.

4. The method of claim 3, wherein the catalyst is ammonium hydroxide.

5. The method of claim 1, wherein the silica precursor is hydrolyzed and condensed in the organic solvent for a time of from about 15 minutes to about 60 minutes, while stirring.

6. The method of claim 1, wherein $R^{1a}$, $R^{1b}$, $R^{1c}$ and $R^{1d}$ are all each —$OCH_3$ or all each —$OCH_2CH_3$.

7. The method of claim 1, wherein $R^{3a}$, $R^{3b}$ and $R^{3c}$ are all —$OCH_3$.

8. The method of claim 1, wherein $R^4$ is unsubstituted $C_{1-30}$alkyl, $C_{3-30}$cycloalkyl, $C_{6-18}$aryl or $C_{4-14}$heteroaryl.

9. The method of claim 8, wherein $R^4$ is $C_{2-10}$alkyl.

10. The method of claim 1, wherein x is 0.3 or 0.45.

11. The method of claim 1, wherein the surface passivation agent is hexamethyldisilazane.

12. The method of claim 1, wherein the solvent is removed by a method comprising $CO_2$ supercritical drying.

\* \* \* \* \*